United States Patent [19]

Staffanson

[11] Patent Number: 4,848,068
[45] Date of Patent: Jul. 18, 1989

[54] ROTARY DITCH CLEANING DEVICE

[76] Inventor: Leroy Staffanson, Rte. 1, Box 3076, Sidney, Mont. 59270

[21] Appl. No.: 236,859

[22] Filed: Aug. 26, 1988

[51] Int. Cl.[4] .......................................... A01D 55/20
[52] U.S. Cl. .................................................. 56/12.7
[58] Field of Search ................. 56/10.3, 10.6, 12.7, 56/13.5, 16.9, 17.1, 17.4, 17.5, 156, 229, 249, 289, 295; 37/81, 91, 99, 151, 191

[56] References Cited

U.S. PATENT DOCUMENTS

| | | | |
|---|---|---|---|
| 736,348 | 8/1903 | Beckley | 37/99 |
| 1,029,359 | 6/1912 | Gilchrist | 37/99 X |
| 1,398,195 | 11/1921 | Liggett | 37/151 |
| 2,031,279 | 2/1936 | Newman | 37/191 |
| 2,731,782 | 1/1956 | Mason | 56/13.5 |
| 2,871,643 | 2/1959 | McClellan | 56/13.5 |
| 2,937,463 | 5/1960 | Pougnet | 37/99 |
| 3,896,570 | 7/1975 | McMurray | 37/189 |
| 4,095,545 | 6/1978 | Vaughn et al. | 56/156 X |

Primary Examiner—Thuy M. Bui
Attorney, Agent, or Firm—Norman B. Rainer

[57] ABSTRACT

An apparatus is provided for removing weed growth from an irrigation ditch of generally V-shaped contour. The apparatus is caused to ride within the ditch while being towed by a vehicle. The apparatus has two motor-driven mowing axles adapted to be adjustably disposed upon the opposite walls of the ditch. Each axle has a multitude of flail-type cutting blades. The axles are preferably rotated in opposite directions. A protective shroud is disposed above each axle.

6 Claims, 4 Drawing Sheets

ROTARY DITCH CLEANING DEVICE

BACKGROUND OF THE INVENTION

This invention relates to irrigation and drainage ditches and more particularly to a device for removing weeds, grass, and other herbage from the walls of such ditches.

Irrigation and drainage ditches are usually created by a ditch digging apparatus which is towed behind a tractor or other farm vehicle. Such apparatus, commonly referred to as a ditcher, has cutting means which plow into the soil to form a V-shaped trough. Water is routed through such ditches to the crop fields in order to supply the crops vital moisture for growth. Transversely cut grooves or syphon tubes connect with such ditches in order to transfer water from the ditches into the fields. Between irrigations, weeds and grasses grow in the ditches, thereby diminishing the flow of water into the fields. Cleaning of the ditches is necessary in order to restore adequate water flow through the ditches.

It is common practice to clean such ditches by re-cutting the ditches with the ditcher. Alternatively, herbage-killing sprays and diesel fuel torches are employed. When the ditcher is used for cleaning weeds and herbage, it usually removes additional soil along with the weeds, thereby deepening the ditches. Repeated practice may interfere with efficient water flow to the crops. The use of sprays may have an adverse effect on crops. Furthermore, sprays and torch treatments are expensive techniques for weed control.

It is accordingly a primary object of the present invention to provide an apparatus for removing undesired herbage from irrigation ditches.

It is another object of the invention to provide an apparatus of the aforesaid nature which will not substantially alter the depth or shape of said ditches.

It is a further object of the present invention to provide apparatus of the aforesaid nature which is adjustably conformable to a variety of ditch wall angles.

It is yet another object of the present invention to provide a ditch cleaning apparatus which may be towed by a variety of vehicles and amenable to low cost manufacture.

These objects and other objects and advantages of the invention will be apparent from the following description.

SUMMARY OF THE INVENTION

The above and other beneficial objects and advantages are accomplished in accordance with the present invention by a rotary ditch cleaning apparatus comprised of:

- (a) a central support elongated in the direction of travel of said apparatus and having upper and lower surfaces, left and right side surfaces, front and rear extremities, at least one pair of parallel holding plates downwardly emergent from said lower surface and having facing surfaces which support a horizontal axle, front and rear engagement means associated with each side surface, and coupling means associated with said front extremity and adapted to be engaged by a towing vehicle.
- (b) a positioning wheel mounted upon each axle and adapted to rotate in contact with the bottom of the ditch and in a vertical plane that bisects said central support,
- (c) left and right mowing axles elongated between leading and trailing extremities and having attached thereto at spaced intervals radially outstanding appendages which pivotably hold flail cutting means.
- (d) a shroud positioned about each axle and having a downwardly directed opening through which the cutting blades protrude, and fore and aft extremities provided with transverse plates having bearing means that rotatively support the leading and trailing extremities, respectively, of said mowing axle,
- (e) forward and rearward mounting means associated with each shroud and interactive with the front and rear engagement means, respectively, of said central support in a manner to adjustably dispose the leading extremities of the mowing axles below said central support adjacent the front extremity thereof while positioning the trailing extremities upwardly and outwardly from said central support, thereby disposing said axles one in front of the other in an angled relationship whose apex coincides with the bottom of the ditch.
- (f) a stabilizing roller mounted downwardly from the left extremity of each shroud and adapted to rotate against the wall of the ditch and having an axis perpendicular to the direction of travel of the apparatus, and
- (g) means to rotate said mowing axles in opposite directions.

In a preferred embodiment, axle-positioning means are employed comprised of a center bar pivotably attached to the upper surface of the central support and having front and rear extremities that pivotably hold struts extending to pivoted attachment with the rear extremities of the shrouds. By virtue of such construction, twisting movement of the center bar causes alteration in the angle of interaction of the mowing axles.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
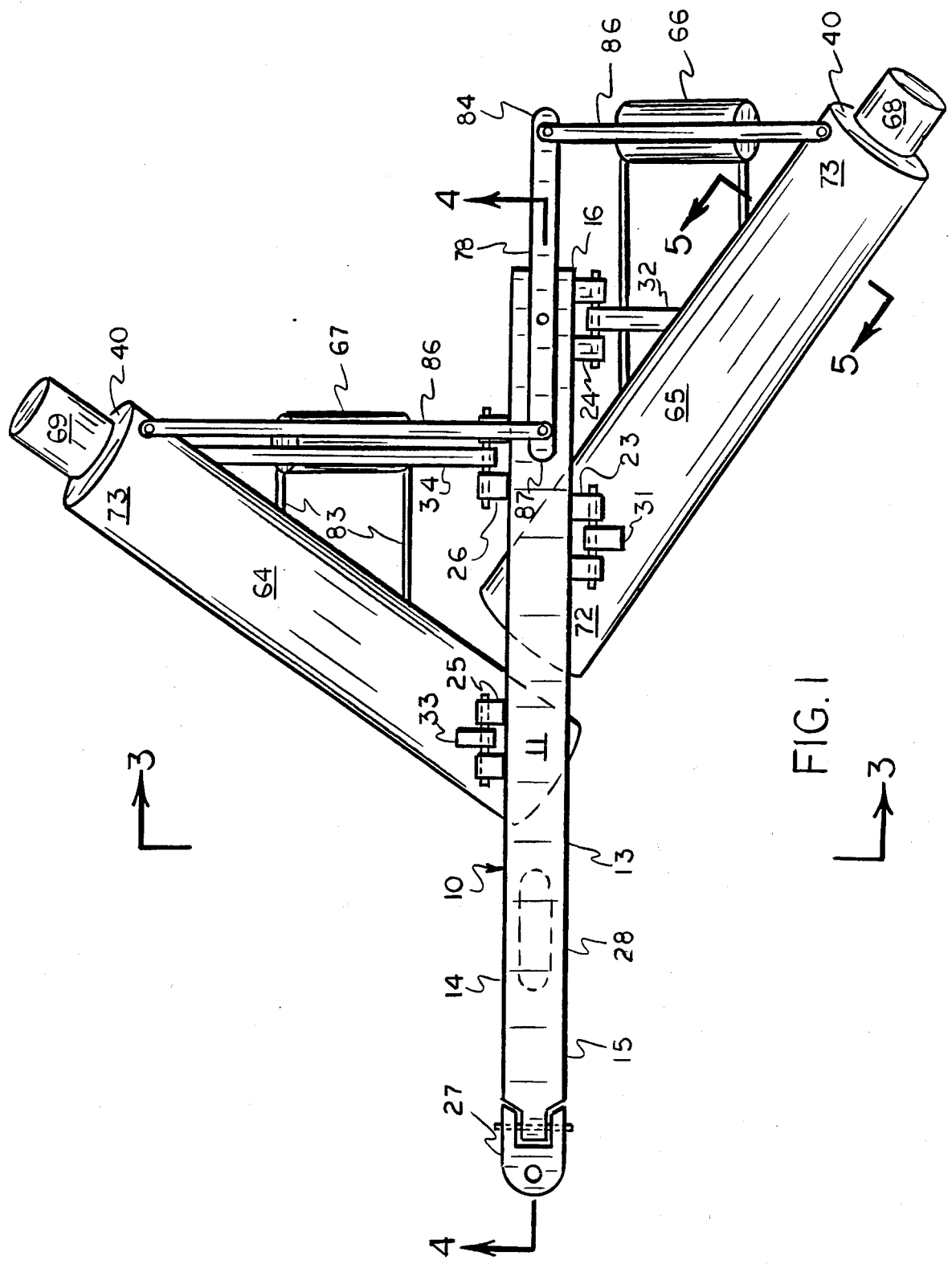
FIG. 1 is a top view of an embodiment of a rotary herbage trimmer apparatus of the present invention.
Figure 2:
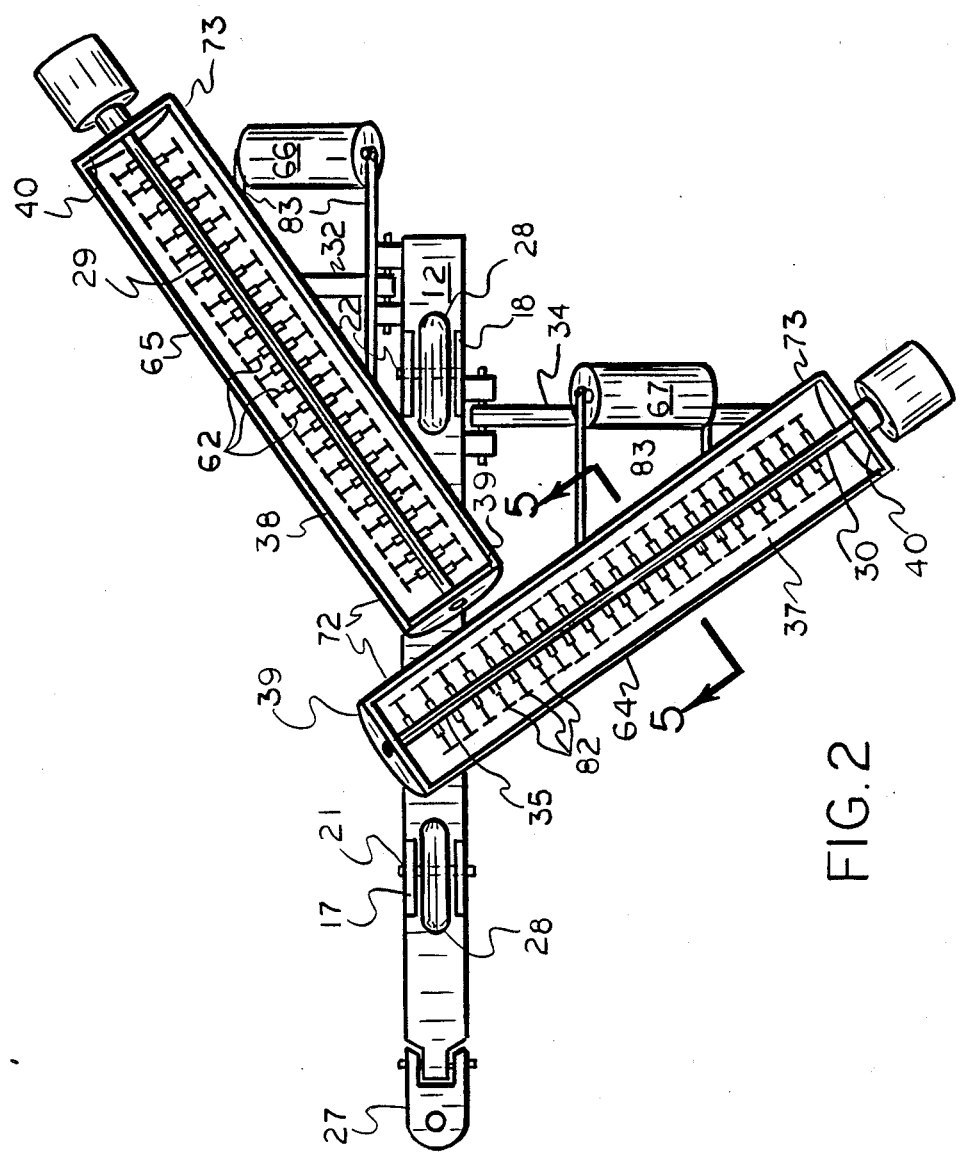
FIG. 2 is a bottom view of the apparatus of FIG. 1.
Figure 3:
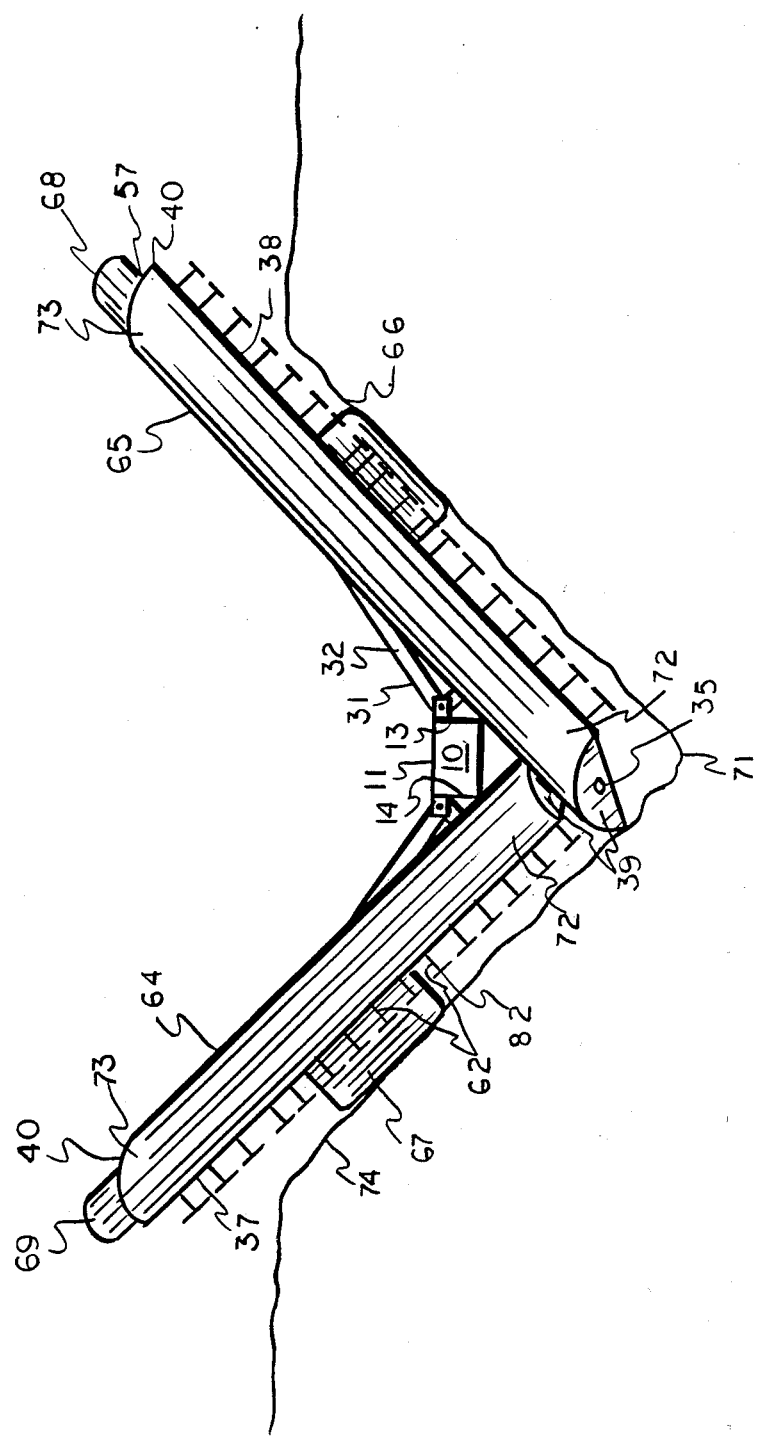
FIG. 3 is a sectional view taken upon the line 3—3 of FIG. 1, and showing the apparatus in functional engagement with an irrigation ditch.
Figure 4:
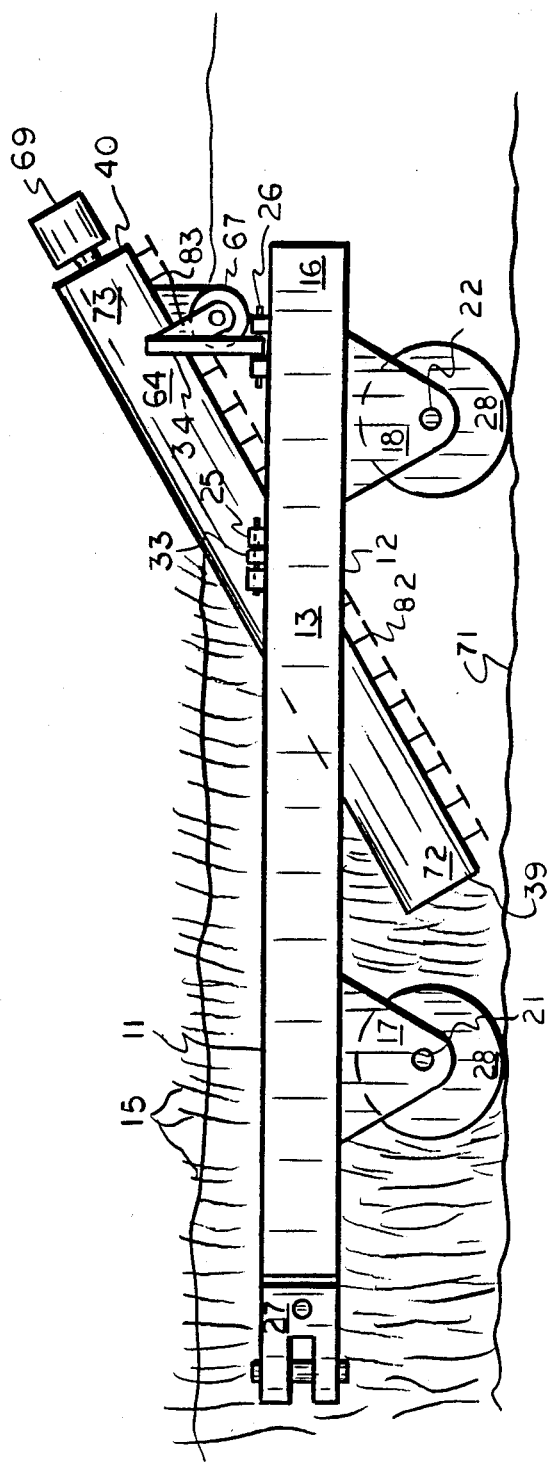
FIG. 4 is a sectional view taken upon the line 4—4 of FIG. 1.
Figure 5:
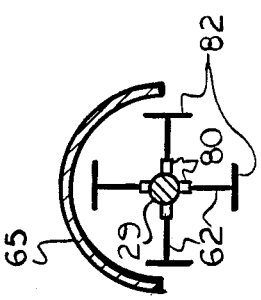
FIG. 5 is a sectional view taken upon the line 5—5 of FIG. 1.

Referring to the drawing, an embodiment of the rotary herbage trimmer of the present invention is shown comprised of central support 10 elongated in the direction of travel of said apparatus, said central support having upper and lower surfaces 11 and 12 respectively, left and right side surfaces 13 and 14 respectively, and front and rear extremities 15 and 16 respectively. In the embodiment herein exemplified, forward and rearward pairs of parallel holding plates 17 and 18, respectively, are downwardly emergent from lower surface 12. The plates support forward and rearward horizontal axles 21 and 22, respectively. Front and rear engagement means 23 and 24, respectively, are associated with left side surface 13, and front and rear engagement means 25 and 26, respectively, are associated with right side surface 14. Front extremity 15 pivotably supports segmented coupling means 27 adapted to be engaged by a towing vehicle, said coupling means serving to function as a universal joint with respect to the towing vehicle.

Wheels 28 are mounted upon said axles and adapted to rotate in contact with the bottom of ditch 17 and in a vertical plane containing the long axis of central support 10. The central support may, in alternative embodiments, have more than one pair of holding plates and associated axles and wheels.

Left and right mowing axles 29 and 30, respectively, elongated between leading and trailing extremities 35 and 36, respectively, have attached thereto at spaced intervals appendages in the form of posts 80 directed radially outward from the axle. The outermost extremity of each post pivotably secures a flail-type cutting member 62 which terminates in a cutting blade 82 elongated coextensively with the axle. The centrifugal force generated by rotation of the axle causes blade 82 to define a cutting path in the form of a band centered upon the axle.

Left and right shrouds 64 and 65, respectively, of generally circular cylindric contour are coaxially positioned about the respective axles. Shrouds 64 and 65 have downwardly directed openings 37 and 38, respectively, through which said cutting blades protrude. The shrouds have fore and aft extremities 72 and 73, respectively, which confine transverse plates 39 and 40, respectively, having bearing means that rotatively support the leading and trailing extremities, respectively, of said mowing axles.

Forward and rearward mounting beams 31 and 32, respectively, extend between the left shroud and the left side surface of the central support. Similarly, forward and rearward mounting beams 33 and 34, respectively, extend between the right shroud and the right side surface. Each of said mounting beams pivotably interacts with corresponding engagement means 23, 24, 25 and 26 attached to the side surfaces of the central support. The manner of attachment of the shroud and associated mower axle to the central support is such as to dispose the leading extremities of the axles below the central support adjacent front extremity 15. The trailing extremities of the axles are attendantly positioned in an upward direction displaced outwardly from the central support.

The axles are disposed one in front of the other. In the illustrated embodiment, the right axle is in front of the left axle, but this may be reversed in other embodiments. The axles are disposed in a substantially V-shaped angled relationship whose apex coincides with the bottom of the ditch. The magnitude of the V-shaped angle may be controlled to accommodate the geometry of the ditch.

Stabilizing rollers 66 and 67 are mounted on brackets 83 beneath and to the rear of the downwardly directed openings of said left and right shrouds, respectively, and are adapted to rotate upon the ditch walls 74. The rollers may be pneumatically inflated, bouyant tires.

Motors 68 and 69 are associated with the aft extremities of the left and right shrouds, respectively. The motors may be driven by pneumatic or hydraulic force, or may be gasoline driven engines or electric motors. The motors rotate the mowing axles at high speed in opposite directions. Such action causes a cutting of herbage in the ditch and a throwing of the cut herbage forwardly and out of the ditch. In some embodiments the direction of rotation may be reversed to throw the cut herbage rearwardly into the ditch.

Axle-positioning means, best shown in FIG. 1, is comprised of center bar 78 pivotably attached to the upper surface of central support 10 and having front and rear extremities 87 and 84, respectively, that pivotably hold struts 86 extending to pivoted attachment with the rear extremities of the shrouds. In the exemplified embodiment, the front strut is associated with the right shroud, and the rear strut is associated with the left shroud. Such arrangement would, however, be reversed in a mirror-image embodiment of the apparatus of this invention. The axle-positioning means causes the mowing axles to be equi-angularly disposed about the vertical plane defined by bottom line 71 of the ditch.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An apparatus for removing weed growth from a substantially V-shaped irrigation ditch while traveling along said ditch, said apparatus comprising:
   (a) a central support elongated in the direction of travel of said apparatus and having upper and lower surfaces, left and right side surfaces, front and rear extremities, front and rear engagement means associated with each side surface, and coupling means associated with said front extremity and adapted to be engaged by a towing vehicle,
   (b) at least one positioning wheel pendant from the lower surface of said central support and adapted to rotate in contact with the bottom of the ditch and in a vertical plane that bisects said central support,
   (c) left and right mowing axles elongated between leading and trailing extremities and having a number of flail cutting means attached thereto at spaced intervals,
   (d) a shroud positioned about each mowing axis and having a downwardly directed opening through which the cutting means protrude, and fore and aft extremities having bearing means that rotatively support the leading and trailing extremities, respectively, of said mowing axle,
   (e) forward and rearward mounting means associated with each shroud and interactive with the front and rear engagement means, respectively, of said central support in a manner to adjustably dispose the leading extremities of the mowing axles below said central support adjacent the front extremity thereof while positioning the trailing extremities upwardly and outwardly from said central support, thereby disposing said axles one in front of the other in an angled relationship whose apex coincides with the bottom of the ditch,
   (f) a stabilizing roller mounted downwardly from each shroud and adapted to rotate against a wall of the ditch and having an axis substantially perpendicular to the direction of travel of the apparatus, and (g) means to rotate said mowing axles in opposite directions.

2. The apparatus of claim 1 wherein two positioning wheels are disposed below the lower surface of said central support.

3. The apparatus of claim 2 wherein said positioning wheels rotate upon axles held between parallel plates extending downwardly from said central support.

4. The apparatus of claim 1 wherein said cutting means comprise blades elongated in the direction of the associated mowing axle.

5. The apparatus of claim 1 wherein the bearing means for said axles are mounted in plates associated with the fore and aft extremities of the shroud and transversely disposed to the mowing axle.

6. The apparatus of claim 1 having axle-positioning means comprising a center bar pivotably attached to the upper surface of the central support and having front and rear extremities that pivotably hold struts extending to pivoted attachment with the rear extremities of the shrouds, whereby twisting movement of said center bar causes alteration in the angle of interaction of the mowing axles.

* * * * *